United States Patent [19]
Prusha

[11] Patent Number: 5,204,127
[45] Date of Patent: Apr. 20, 1993

[54] COMPRESSION MOLDING APPARATUS

[75] Inventor: Thomas J. Prusha, Winona, Minn.

[73] Assignee: Composite Products, Inc., Winona, Minn.

[21] Appl. No.: 698,044

[22] Filed: May 10, 1991

[51] Int. Cl.$^5$ .............................................. B29C 43/34
[52] U.S. Cl. ..................................... 425/544; 425/256; 425/414; 425/468; 425/577; 425/595
[58] Field of Search ............... 425/290, 291, 414, 468, 425/577, 544, 589, 595, 256, 185, 450.1, DIG. 58; 264/163, 154

[56] References Cited

U.S. PATENT DOCUMENTS

| | | | |
|---|---|---|---|
| 3,060,509 | 10/1962 | McCubbins, Jr. | 425/577 |
| 3,165,787 | 1/1965 | Carmack | 425/290 |
| 3,341,897 | 9/1967 | Susuki et al. | 425/577 |
| 3,509,603 | 5/1970 | Halsall et al. | 425/468 |
| 3,595,301 | 7/1971 | Bauer | 425/577 |
| 3,706,116 | 12/1972 | Drazick | 425/450.1 |
| 3,843,088 | 10/1974 | McLoughlin et al. | 425/577 |
| 3,915,613 | 10/1975 | Ruch | 425/DIG. 58 |
| 3,972,668 | 8/1976 | Cassna, Jr. | 425/450.1 |
| 4,069,000 | 1/1978 | Hampshire | 425/412 |
| 4,443,173 | 4/1984 | Mansberger, II | 425/126.1 |
| 4,452,420 | 6/1984 | Lundquist | 425/577 |
| 4,533,312 | 8/1985 | Von Holdt | 425/DIG. 58 |
| 4,768,747 | 9/1988 | Williams | 425/468 |
| 4,889,480 | 12/1989 | Nakamura et al. | 425/450.1 |
| 4,938,909 | 7/1990 | Daly | 425/577 |
| 4,986,942 | 1/1991 | Irgens et al. | 425/577 |

FOREIGN PATENT DOCUMENTS

| | | | |
|---|---|---|---|
| 344593 | 12/1921 | Fed. Rep. of Germany | 425/290 |
| 60-124218 | 7/1985 | Japan | 425/468 |
| 61-254308 | 11/1986 | Japan | 425/468 |

Primary Examiner—Jay H. Woo
Assistant Examiner—Robert B. Davis
Attorney, Agent, or Firm—Moore & Hansen

[57] ABSTRACT

There is provided by the present invention a compression molding tool for producing apertures of a desired configuration in preselected locations in a compression molded article and a method for producing the apertures. The tool has first and second relatively movable tool halves each supporting a mold section. The mold section associated with the second tool half includes a movable portion that is relatively movable with respect to the second tool half. The first tool half is moved relative to the second tool half until the first and second mold sections engage each other to form a mold cavity therebetween. Devices for creating apertures are included on at least one of the mold sections and are extended into appropriately configured receptacles in the other mold section after the mold sections are engaged, but before molding material is forced by compression into the mold cavity. The engaged mold sections are then moved relative to a stationary portion of the second tool half so as to compress a molding material that flows into and within the mold cavity to form a compression molded article.

23 Claims, 4 Drawing Sheets

COMPRESSION MOLDING APPARATUS

BACKGROUND OF THE PRESENT INVENTION

The present invention relates to tools useful for producing compression molded articles.

Traditionally, one method for producing molded articles has been to place a molding material between spaced apart, relatively movable tool halves, each tool half comprising a press platen supporting a die or mold on a molding press for shaping the desired article. The mold press or tool is then closed, resulting in the application of pressure to the molding material, which flows to fill the mold cavity created by the closing tool. Depending on the particular material used to create the molded article, the tool may be heated or cooled during the molding process. Subsequently, the tool is opened and the newly molded article is removed from the tool. This traditional molding operation is capable of producing a large number of articles at a rapid rate.

A major disadvantage of the traditional compression molding process is that significant post-molding processing is required in some instances to produce a commercially acceptable article, which puts compression molding at a competitive disadvantage with injection molding processes. The need for these post-processing operations stems from at least two sources, one of which is "flashing" — excess material that is created at the edge of molded parts during the compression molding process. Flashing arises from the inherent nature of the traditional compression molding process. That is, in this process the molding material begins to flow when pressure is applied to it. At that moment, however, the mold cavity is not yet formed and will not be completely formed until the tool completely closes. In other words, until the moment of tool closing, the molding material is flowing within an incompletely formed mold cavity. To retain the material in the cavity as the tool closes, the tool has sliding shear edges on the tool perimeter that can draw molding material into the gap between the opposed sliding edges, thus producing the flashing. If the molding material is fiber reinforced, the flashing at the edge of the article may include protruding reinforcing fibers, which are especially unacceptable in a consumer market. Flashing must be removed after molding by a separate process and at an additional cost to the manufacturer.

A second disadvantage of the traditional compression molding process is that apertures of a desired configuration may be placed in the molded article during the molding process only in the line of draw; that is, they must have an axis that lies parallel to the direction of tool closing. The apertures are created by the extension of a core pin from one of the tool halves into an appropriately configured receiving hole in the other tool half. Apertures cannot be formed non-parallel to the line of draw since to make such apertures the non-parallel core pins can be set in place only at the moment of closing of the tool halves. That is because until that moment the pin and the receiving hole will not be in alignment with each other. The core pins, however, need to be set in place before that instant in time or the pin receiving holes will fill with the already flowing molding material. Therefore, to add apertures to the article that are non-parallel to the line of draw, the manufacturer must undertake post-processing operations to insert apertures where desired.

It would be desirable to have a compression molding tool capable of substantially eliminating flashing and that produces apertures at any desired angle in the molded article, thereby reducing post molding processing operations and expenses.

SUMMARY OF THE PRESENT INVENTION

It is a principal object of the present invention to provide new and improved apparatus not subject to the foregoing limitations and disadvantages.

It is another object of the present invention to provide a tool for producing compression molded articles having at least one hole produced in the article oriented non-parallel to the line of draw.

It is yet another object of the present invention to provide a tool for producing compression molded articles that does not producing flashing at the edges of the article.

It is still another object of the present invention to provide a tool for producing compression molded articles that reduces post-molding machining operations and associated costs.

There is provided according to the present invention a compression molding tool that eliminates flashing at the perimeter edges of a compression molded article and that enables apertures to be created in the article during molding at the desired locations and angles. Such a tool includes first and second tool halves that are relatively movable towards and away from each other. Each tool half may comprise a press platen which supports a mold section shaped to cooperate in defining a mold cavity so as to form a desired article. The mold section associated with one of the tool halves is comprised of a movable portion and a stationary portion, with the movable portion being movably supported and biased relative to the stationary portion along the line of draw. In the preferred embodiment, this is accomplished by springs positioned between the stationary portion and the movable mold section portion of one of the tool halves.

The tool further includes at least one core pin disposed at a desired location at a desired angle to the line of draw to create specifically located and configured apertures where desired in the molded article. The tool may also include at least one locking pin disposed substantially perpendicularly to the line of draw for rigidly affixing the first and second halves to one another during the molding operation.

The foregoing objects of the invention will become apparent to those skilled in the art when the following detailed description of the invention is read in conjunction with the accompanying drawings and claims. Throughout the drawings, like numerals refer to similar or identical parts.

DETAILED DESCRIPTION OF THE PREFERRED EMBODIMENT

Figure 1:
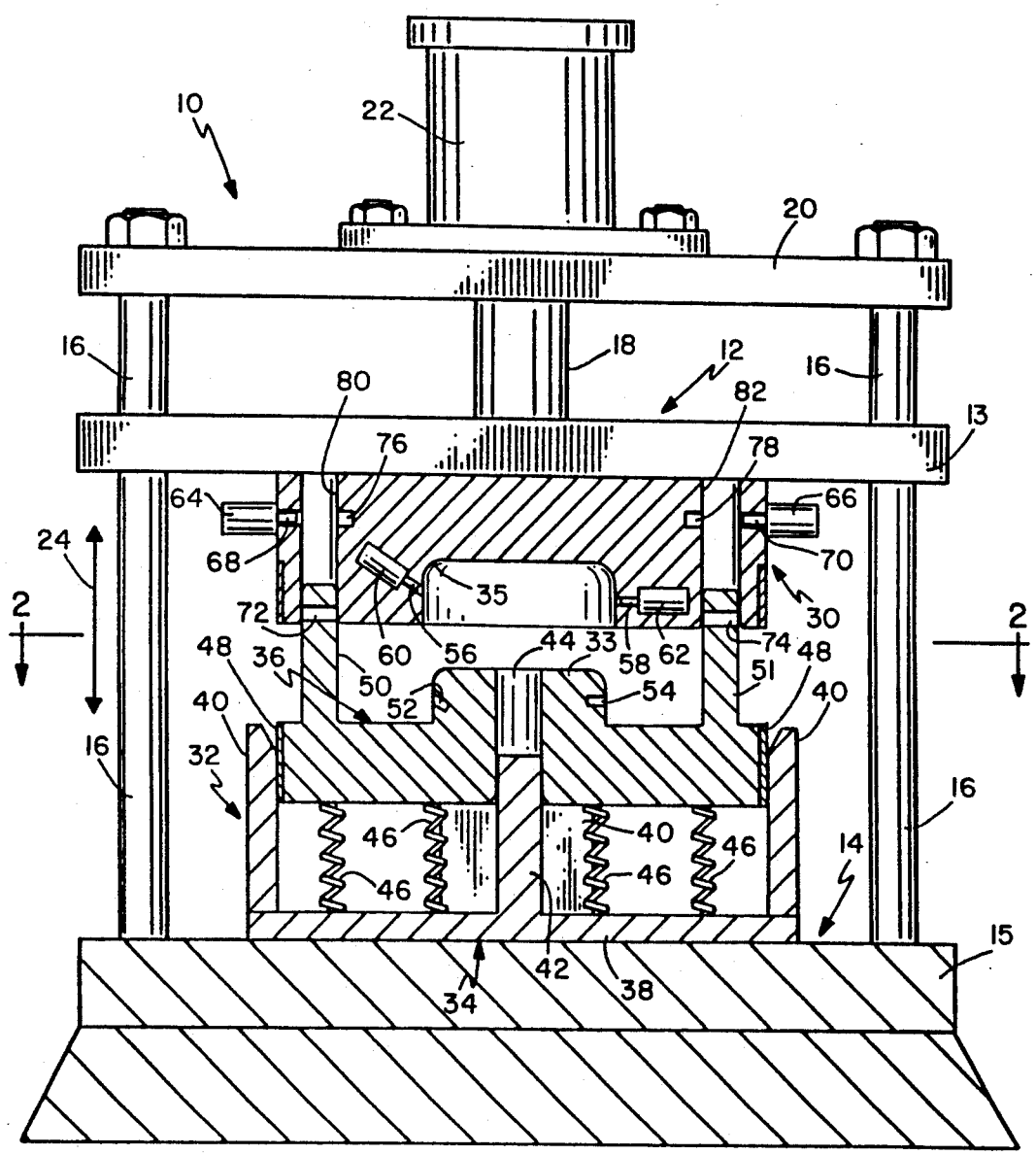
FIG. 1 shows a side elevation cross sectional view of the present invention taken along cutting plane lines 1—1 of FIG. 2 and wherein the first and second mold sections are in an open premolding position.
Figure 2:
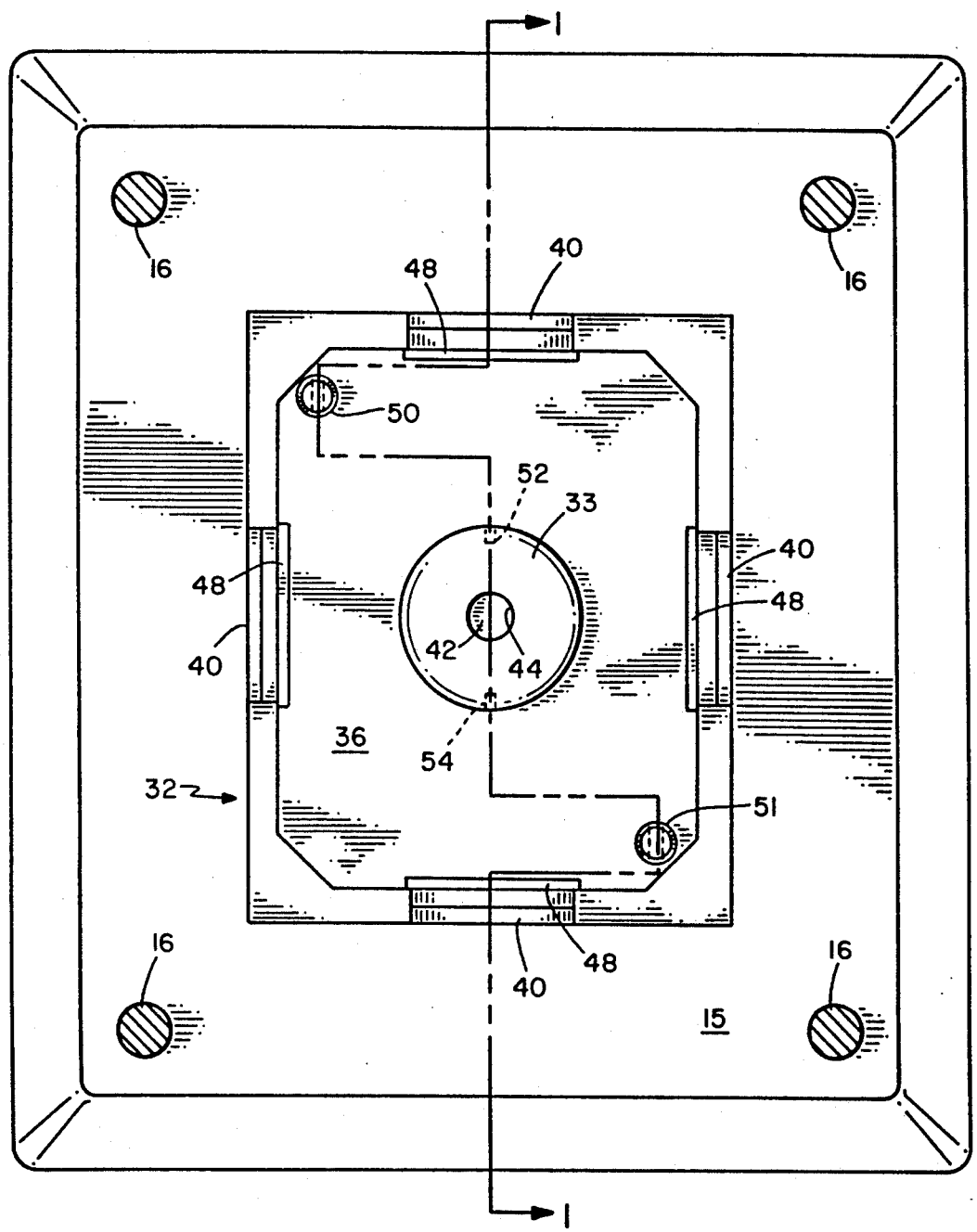
FIG. 2 shows the second, or bottom mold section in a plan view taken along cutting plane lines 2—2 of FIG. 1.

Referring now to FIGS. 1 and 2, there is shown a compression molding press 10 for producing parts of a specific desired shape having apertures at specific selected locations. Apparatus 10 includes first and second tool halves indicated generally by reference numerals 12 and 14. Usually, though not necessarily, the second, or bottom, tool half 14 is stationary and includes a fixed base plate or platen 15. The first, or top, tool half 12 is movably supported thereabove by its horizontally extending press platen 13. Press platen 13 is slidably mounted on a plurality of upright members 16 and is movable with respect to second press platen 15 by an actuation means 18 such as an hydraulic cylinder. Upright supports 16 support a top plate 20 that in turn supports the necessary equipment 22 to activate actuation means 18, all in a manner well known in the art and which will not be discussed further herein.

The tool halves 12 and 14 are relatively movable in a vertical direction as indicated by line of draw arrow 24. First press platen 13 of tool half 12 supports a first die or mold section 30 while second press platen 15 of tool half 14 supports a second die or mold section 32. Second mold section 32 includes a stationary portion 34 and a relatively movable portion 36. Stationary portion 34 includes a base 38 and a plurality of upwardly extending guide blocks 40. Guide blocks 40 operate to keep movable portion 36 precisely positioned with respect to stationary portion 34. Stationary portion 34 further includes an upwardly extending plunger 42 that is slidingly received by a sleeve 44 of movable portion 36. A protruding male portion 33 of mold section 32 is disposed in face-to-face relation with a receiving, mold cavity forming recess 35 in mold section 30.

Movable portion 36 is movably supported relative to stationary portion 34 by biasing means 46 such as coil springs as shown in FIG. 1. Movable portion 36 may also include wear plates 48 that slide against guide blocks 40. If desired, movable portion 36 may include one or more upwardly extending locking links 50, 51 whose function will be explained below. Movable portion 36 of second mold portion 32 further includes one or more receiving holes 52 and 54 disposed in that portion of the movable portion 36 that acts as a wall of the actual molding cavity to be discussed in reference to FIGS. 3 and 4. Receiving hole 54 is shown placed substantially transversely to the line of draw 24. Thus receiving hole 54 has a substantially horizontal arrangement. Receiving hole 52, on the other hand, is disposed at an acute angle to the line of draw 24.

Receiving holes 52 and 54 are configured to respectively receive core pins 56 and 58, which are driven by actuation means 60 and 62 respectively from first mold section 30 into movable portion 36 of second mold section 32. First mold section 30 further includes actuation means 64 and 66 that first drive locking pins 68 and 70 into and through appropriately configured locking pin sleeves 72 and 74 disposed in locking links 50 and 51 respectively and then into receiving holes 76 and 78 in the first mold section 30. A pair of sleeves 80 and 82 are configured to slidably receive locking links 50 and 51 respectively when first press platen 13 is moved toward second press platen 15.

Figure 3:
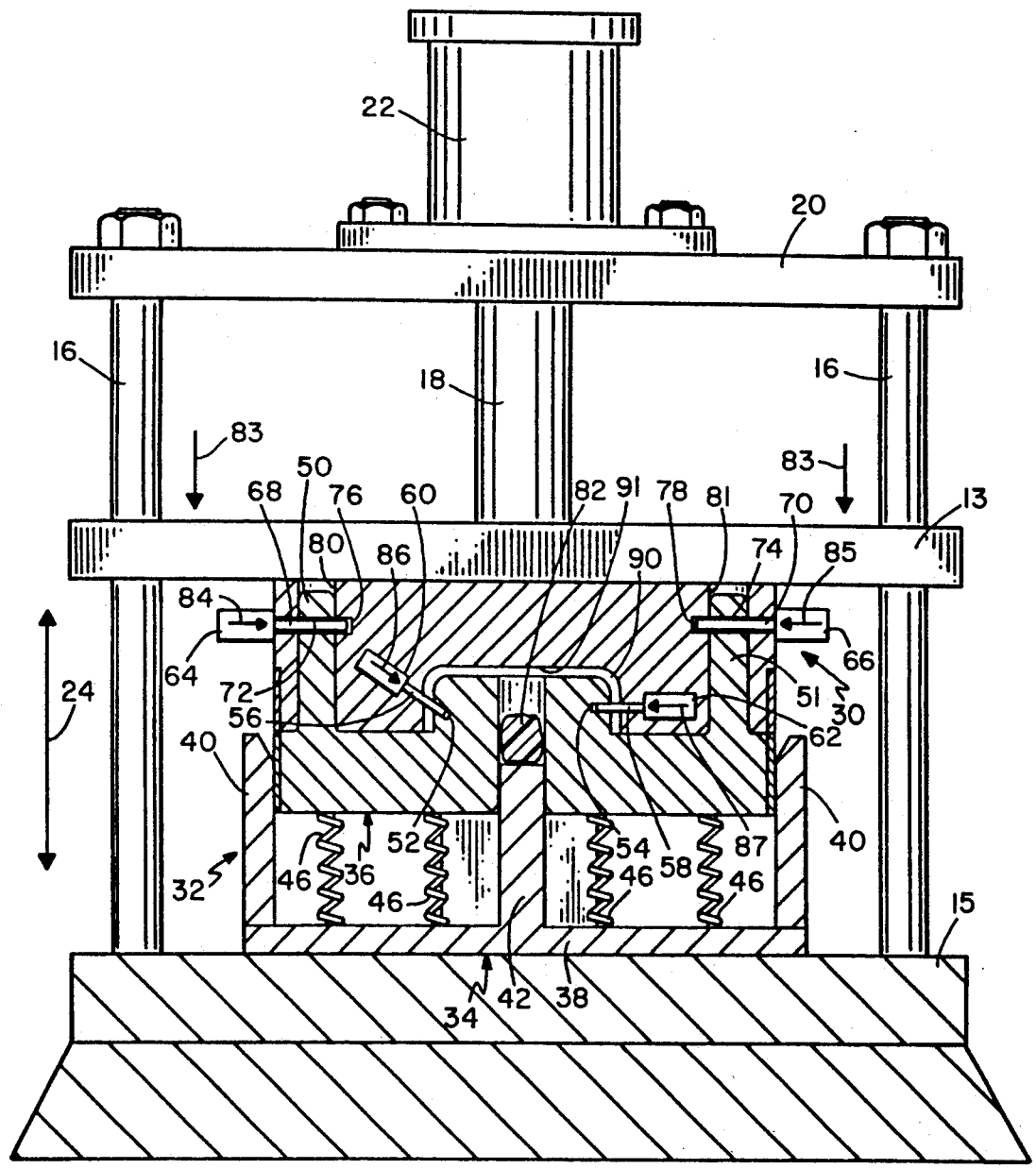
FIG. 3 shows a side elevation, cross sectional view in the same plane as FIG. 1 and wherein the first and second mold sections are joined to form the molding cavity and the core pins are extended between the mold sections in aperture forming positions.
Figure 4:
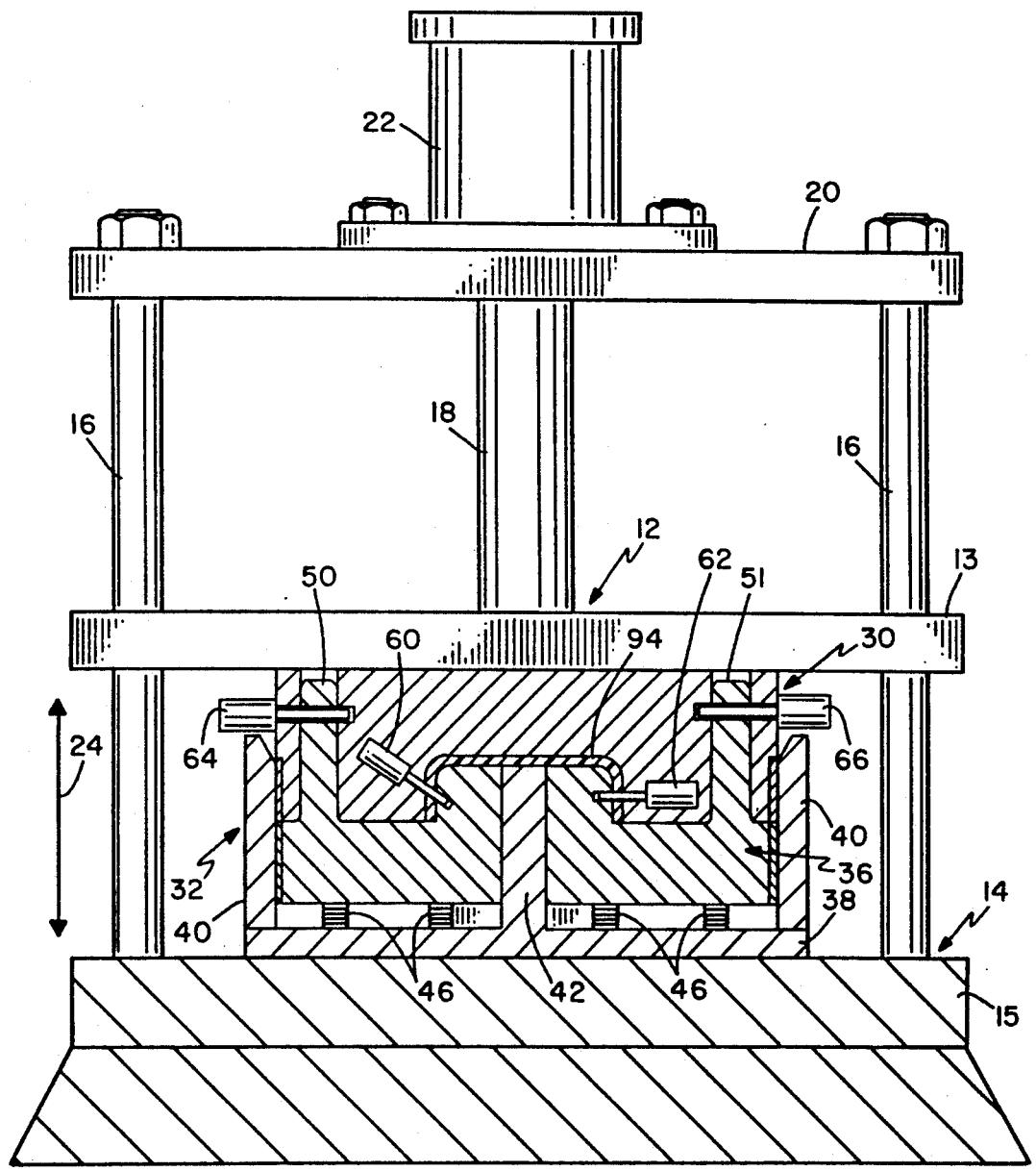
FIG. 4 depicts the present invention in a side elevation, cross-sectional view in the same plane as FIG. 1 with the tool and mold sections in a fully closed, molding position.

The basic features of the improved compression molding apparatus 10 having thus been described, the operation of the apparatus will now be described with reference to FIGS. 3 and 4. Thus, with the mold fully open, and mold sections 30 and 32 fully separated as shown in FIG. 1, a molding material 82 is placed on top of plunger 42 at the location shown in FIG. 3 by known means. The molding material is introduced in a plastic, workable state, and may comprise, for example, a preform of desired molding material such as a thermoplastic resin. Press platen 13 of first tool half 12 is lowered by the extension of actuation means 18 towards stationary portion 34 of second tool half 14 as indicated by arrows 83. Locking links 50 and 51 are slidably received by sleeves 80 and 82 respectively. As indicated by arrows 84 and 85, locking pins 68 and 70 are respectively driven by actuation means 64 and 68 through sleeves 72 and 74 of locking links 50 and 51 and into receiving holes 76 and 78 respectively, thus firmly anchoring first mold section 30 to movable portion 36 of second mold section 32. With the two mold sections 30 and 32 thus in the engaged position as shown in FIG. 3, core pins 56 and 58 are driven by actuation means 60 and 62 into receiving holes 52 and 54 as shown by arrows 86 and 87 respectively.

When the first mold section 30 is joined to the movable portion 36 of second mold section 32, a mold cavity 90 is formed therebetween. As shown in the Figures, plunger 42 is located on the stationary portion 34 of second mold section 32 so as to be substantially centrally positioned with respect to the mold cavity 90, though other positions are within the scope of the present invention. Mold cavity 90 has a bowl shaped configuration as seen in the drawings but may have other configurations as is well understood. After the core pins and locking pins have been set, first press platen 13 is lowered further by actuation means 18, carrying movable portion 36 of second mold section 32 therewith and compressing springs 46. As the downward movement, or molding stroke continues, the top surface 91 of mold cavity 90 contacts molding material 82 and begins to compress it. As the material 82 is compressed by the downward movement, it will begin to flow into and within mold cavity 90, thereby filling it as shown in FIG. 4. The mold material will flow around the core pins to create specifically located and specifically configured apertures in the newly molded article 94.

When the molding operation is complete, the tool movement will be reversed. That is, the core and locking pins will be withdrawn thereby freeing movable portion 36 from first mold section 30. First press platen 13 will be moved upwardly carrying first mold section 30 therewith and allowing biasing means 46 to raise movable portion 36 with respect to stationary portion 34 of mold section 32. Upon complete separation of first mold section 30 from movable portion 36 of second mold section 32, the molded article will be able to be removed from the mold. The article produced by the apparatus will contain the appropriately located and configured apertures. This will reduce the post molding processing time since such apertures will no longer need to be added after the molding operation. In addition, the amount of flashing needed to be removed will be limited to a small area located in the vicinity of where the plunger 42 slides within sleeve 44. The improved apparatus 10 overcomes the prior art problem of outward forcing of mold material along sliding edges of the mold cavity as the mold sections are closed by providing an essentially completely formed mold cavity prior to the forced flow of the molding material within the mold cavity.

The present invention having thus been described, other modifications, alterations, or substitutions may now suggest themselves to those skilled in the art, all of which are within the spirit and scope of the present invention. For example, in many instances the weight of the first tool half may be sufficiently great that first and second mold sections 30 and 32 will remain engaged during a molding operation without requiring the fixation provided by locking links 50 and 51 and locking pins 68 and 70, respectively. Furthermore, while coil springs are shown as being used to bias movable portion 36 relative to stationary portion 34 of mold section 32, other known means, such as hydraulic or pneumatic cylinders may also be used. It is also within the scope of the present invention to have the mold section comprised of the stationary and movable portions disposed above the other mold section. In other words, mold section 32 could be attached to press platen 13 of tool half 12 and mold section 30 could be attached to press platen 15 of tool half 14. Actuation means 60, 62, 64, and 66 could be hydraulic or pneumatic cylinders or electrically driven linear actuators. Also, pins 56 and 58 could be driven from movable portion 36 into first mold section 30 rather than as shown in the Figures. Many other such substitutions will suggest themselves to those skilled in the art. It is therefore intended that the present invention be limited only by the scope of the attached claims below.

What is claimed is:

1. A compression molding tool for production of a molded article, said tool comprising:
   first and second tool halves relatively movable with respect to each other, and first and second mold sections configured to define a mold cavity supported on said first and second tool halves, respectively, in facing relation to each other, said second mold section including a stationary portion and a movable portion, said first mold section and said movable portion of said second mold section being relatively movable towards each other to an engaged position to form therebetween said mold cavity; and
   biasing means engaging said movable portion and normally urging said movable portion away from said stationary portion of said second mold section, and said first mold section and said movable portion of said second mold section being jointly movable in said engaged position against the resistance of said biasing means towards said stationary portion of said second mold section in a molding stroke during which molding material is compressed and forced into said mold cavity; and
   means for creating an aperture in the molded article, said means being actuable to an aperture forming position between said first mold section and said movable portion of said second mold section when said first mold section and said movable portion of said second mold section are moved to said engaged position.

2. The tool of claim 1 and comprising: power means operative to move said first mold section and said movable portion of said second mold section to said engaged position, and for thereafter jointly moving said first mold section and said movable portion of said second mold section in said engaged position through said molding stroke.

3. The tool of claim 2 wherein said power means comprises a single power actuator connected to said first mold section.

4. The tool of claim 1 wherein said tool has a line of draw determined by the direction of the relative movement of said tool halves, and wherein said means for creating an aperture is angularly oriented with respect to said line of draw, whereby an aperture is formed in a direction not in alignment with said line of draw.

5. The tool of claim 4 wherein said means for creating an aperture includes a core pin and actuation means for extending said core pin on one of said mold sections and a receiving hole configured to receive said core pin on the other one of said mold sections, said core pin and said receiving hole being in alignment when said first mold section and said movable portion of said second mold section are moved to said engaged position.

6. The tool of claim 1 wherein said stationary portion of said second mold section includes a plunger and said movable portion includes a sleeve slidingly receiving said plunger, said plunger holding the molding material out of which the compression molded article is formed.

7. The tool of claim 6 wherein said plunger communicates with said mold cavity and holds the molding material at such a location in the path of movement of said first mold section and said movable portion of said second mold section that the molding material is compressed and flows into and within the molding cavity only upon the joint movement of the first mold section and the movable portion of said second mold section in said molding stroke.

8. The tool of claim 6 wherein said plunger and said sleeve are so located on said second mold section as to be substantially centrally positioned with respect to said mold cavity.

9. The tool of claim 1 wherein said biasing means comprises spring means.

10. The tool of claim 1 wherein said biasing means comprises an hydraulic cylinder.

11. The tool of claim 1 wherein said biasing means comprises a pneumatic cylinder.

12. The tool of claim 1, and further including:
    locking link means carried on said first and second mold sections and actuable to lock said first mold section and said movable portion of said second mold section together when in said engaged position.

13. A compression molding tool for production of a molded article, said tool comprising:
    first and second tool halves relatively movable with respect to each other, and first and second mold sections configured to define a mold cavity supported on said first and second tool halves, respectively, in facing relation to each other, said second mold section including first and second portions, said first mold section and said first portion of said second mold section being relatively movable towards each other to an engaged position to form an engaged molding assembly and to form therebetween said mold cavity;
    said second portion of said second mold section being relatively movable with respect to said engaged assembly in a molding stroke during which molding material is compressed and forced into said mold cavity;

means for providing relative motion between said engaged assembly and said second portion; and means for creating an aperture in the molded article, said means being actuable to an aperture forming position between said first mold section and said first portion of said second mold section when said first mold section and said first portion of said second mold section are moved to said engaged position.

14. The tool of claim 13 and comprising:
power means operative to move said first mold section and said first portion of said second mold section to said engaged position.

15. The tool of claim 14 wherein said power means comprises a single power actuator connected to said first mold section.

16. The tool of claim 13 wherein said tool has a line of draw determined by the direction of the relative movement of said tool halves and wherein said means for creating an aperture is actuable in a direction angularly oriented with respect to said line of draw for creating said aperture in a direction not in alignment with said line of draw.

17. The tool of claim 16 wherein said means for creating an aperture includes:
a core pin;
actuation means for extending said core pin on one of said mold sections; and
a receiving hole configured to receive said core pin on the other one of said mold sections, said core pin and said receiving hole being in alignment when said first mold section and said first portion of said second mold section are moved to said engaged position.

18. The tool of claim 13 wherein said second portion of said second mold section includes a plunger and said first portion includes a sleeve slidingly receiving said plunger, said plunger holding the molding material out of which the compression molded article is formed.

19. The tool of claim 18 wherein said sleeve communicates with said mold cavity and said plunger holds the molding material in said sleeve at such a location in the path of said relative movement that the molding material is compressed and flows into and within the molding cavity only upon the relative movement between said second portion of said second mold section and said engaged assembly during said molding stroke.

20. The tool of claim 18 wherein said plunger and said sleeve are so located on said second mold section as to be substantially centrally positioned with respect to said mold cavity.

21. The tool of claim 13 wherein said means for providing relative motion comprises a hydraulic cylinder.

22. The tool of claim 13 wherein said means for providing relative motion comprises a pneumatic cylinder.

23. The tool of claim 13, and further including:
locking link means carried on said first and second mold sections and actuable to lock said first mold section and said first portion of said second mold section together when in said engaged position.

* * * * *